(12) United States Patent
Champagne (10) Patent No.: US 10,190,266 B2
(45) Date of Patent: Jan. 29, 2019

(54) REINFORCED RUBBER GROUND COVER MAT

(71) Applicant: Champagne Edition Inc., Sturgeon County (CA)

(72) Inventor: Alan Rolland Champagne, Sturgeon County (CA)

(73) Assignee: Champagne Edition, Inc., Alberta (CA)

( * ) Notice: Subject to any disclaimer, the term of this patent is extended or adjusted under 35 U.S.C. 154(b) by 0 days.

(21) Appl. No.: 15/576,665

(22) PCT Filed: May 20, 2016

(86) PCT No.: PCT/CA2016/050574
§ 371 (c)(1),
(2) Date: Nov. 22, 2017

(87) PCT Pub. No.: WO2016/187704
PCT Pub. Date: Dec. 1, 2016

(65) Prior Publication Data
US 2018/0135255 A1    May 17, 2018

Related U.S. Application Data

(60) Provisional application No. 62/165,538, filed on May 22, 2015.

(51) Int. Cl.
*E01C 9/08* (2006.01)
*E01C 5/18* (2006.01)
(Continued)

(52) U.S. Cl.
CPC .............. *E01C 9/086* (2013.01); *B29C 43/18* (2013.01); *B32B 15/02* (2013.01); *B32B 21/045* (2013.01);
(Continued)

(58) Field of Classification Search
CPC ....... E01C 9/086; E01C 5/226; B32B 21/045; B32B 15/02; B32B 25/04; B29C 43/18
See application file for complete search history.

(56) References Cited

U.S. PATENT DOCUMENTS 5,139,845 A * 8/1992 Beckerman ............... B32B 3/12
428/117
5,273,373 A * 12/1993 Pouyer .................... E01C 9/086
404/35
5,439,171 A * 8/1995 Fruend .................... B60B 39/12
152/208

(Continued)

FOREIGN PATENT DOCUMENTS

| CA | 2647547 A1 | 10/2007 |
| GB | 824987 A | 12/1959 |
| JP | H0657922 B2 | 8/1994 |

*Primary Examiner* — Abigail A Risic
(74) *Attorney, Agent, or Firm* — Adler Pollock & Sheehan P.C.; Daniel J. Holmander, Esq.

(57) ABSTRACT

A ground cover mat includes a slab that encases a core assembly. The slab is made of a rubber material and defines a lower major surface and an upper major surface of the ground cover mat. The core assembly comprises horizontally extending boards, which may be made of wood, disposed in horizontally spaced apart, side-by-side relation with each other. The core assembly further comprises a rebar mesh, which may be made of steel, that is disposed on top of and in contact with the boards.

20 Claims, 5 Drawing Sheets (51) Int. Cl.
*E01C 5/22* (2006.01)
*B29C 43/18* (2006.01)
*B32B 15/02* (2006.01)
*B32B 25/04* (2006.01)
*B32B 21/04* (2006.01)
*B29K 105/20* (2006.01)
*B29K 705/00* (2006.01)
*B29K 711/14* (2006.01)
*B29L 31/00* (2006.01)

(52) U.S. Cl.
CPC .............. *B32B 25/04* (2013.01); *E01C 5/18* (2013.01); *E01C 5/22* (2013.01); *E01C 5/226* (2013.01); *B29K 2105/20* (2013.01); *B29K 2705/00* (2013.01); *B29K 2711/14* (2013.01); *B29K 2995/0077* (2013.01); *B29L 2031/7324* (2013.01); *B32B 2307/54* (2013.01); *B32B 2311/30* (2013.01); *B32B 2317/16* (2013.01); *B32B 2319/00* (2013.01); *B32B 2471/04* (2013.01)

(56) References Cited

U.S. PATENT DOCUMENTS

| | | | | |
|---|---|---|---|---|
| 5,482,754 | A * | 1/1996 | Crook | E01C 9/086 102/303 |
| 5,820,294 | A * | 10/1998 | Baranowski | A61G 3/061 404/36 |
| 5,924,694 | A * | 7/1999 | Kent | F41J 2/02 273/348.1 |
| 7,427,172 | B2 | 9/2008 | Lukasik | |
| 8,066,447 | B2 * | 11/2011 | Brandstrom | B27M 3/008 144/353 |
| 9,068,434 | B1 * | 6/2015 | Phillips | E01C 9/086 |
| 9,663,902 | B2 * | 5/2017 | Penland, Jr. | E01C 9/086 |
| 2005/0016088 | A1 * | 1/2005 | Pursall | B32B 3/30 52/177 |
| 2006/0248847 | A1 * | 11/2006 | Simon | E01C 5/08 52/741.1 |
| 2006/0286341 | A1 * | 12/2006 | Fowler | B32B 5/02 428/105 |
| 2007/0237581 | A1 * | 10/2007 | Lukasik | E01C 5/18 404/35 |

* cited by examiner

Figure 7

REINFORCED RUBBER GROUND COVER MAT

CROSS REFERENCE TO RELATED APPLICATIONS

This application is a national phase filing under 35 U.S.C. § 371 of International Application No. PCT/CA2016/050574 filed May 20, 2016, which claims priority from U.S. Provisional patent application No. 62/165,538, filed May 22, 2015, the entire contents of which is hereby incorporated by reference herein.

TECHNICAL FIELD

The present invention relates to ground cover mats, and more particularly to reinforced rubber ground cover mats and methods of making reinforced ground cover mats.

BACKGROUND OF THE INVENTION

In the oilfield services industry, and other industries such as construction, mining, farming, and logging, it is common to have to support or transport heavy equipment, such as wheeled machinery, on unpaved soft ground, such as mud, swamp, wetlands, tundra, muskeg and the like. Heavy equipment may sink into such soft ground and become stuck. To avoid this problem, ground cover mats may be used to construct a temporary platform or roadway for the machinery.

The prior art includes examples of reinforced rubber ground cover mats. Canadian Patent 2,473,000 (Fowler et al.) discloses a rubber access mat that includes a rubber slab and a rigidifying grid of reinforcing wire embedded within the rubber slab. The grid consists of a plurality of parallel spaced wires extending between opposed side edges of the slab for most of the width of the rubber slab and a plurality of parallel spaced wires extending between the opposed end edges for most of the length of the rubber slab. Use of reinforcing wire having sizes between ten gauge and three gauge is disclosed. In certain applications, however, the wire grid may tend to cut through the rubber when heavy loads are applied, and thereby form voids that can damage the mat and make it susceptible to moisture infiltration.

Canadian Patent 2,647,547 (Lukasik et al.) and U.S. Pat. No. 7,404,690 (Lukasik et al.) disclose a ground cover mat formed of a one-piece cage that includes two vertically separated layers of orthogonally arranged rebars, which are welded together. The layers are connected by vertically extending connecting rebars that are welded to the rebars of the layers at the intersections to produce a monolithic one-piece cage. The one-piece cage is encased in a flexible material formed of crumb rubber, urethane, and fibers from vehicle tires. However, the cage may require a large amount of rebar to give the mat a desired rigidity, which can make the cage both heavy and labor intensive to manufacture.

Canadian Patent 2,697,174 (Lukasik) and U.S. Pat. No. 7,427,172 (Lukasik) disclose a ground cover mat formed from a plurality of wood planks that are embedded and encased in rubber. In certain applications, however, the wood planks may break or otherwise be damaged if the mat is subjected to heavy loads that are localized over the wood planks.

Therefore, a need continues to exist for improved rubber ground cover mats and methods for manufacturing rubber ground cover mats.

SUMMARY OF THE INVENTION

In one aspect, the present invention comprises a ground cover mat. The ground cover mat comprises a slab, and a core assembly.

The slab is made of a slab material comprising rubber. The slab defines a horizontally extending lower major surface and an upper major surface of the ground cover mat. In use, the lower major surface of the ground cover mat is placed in contact with a ground surface, while the upper major surface provides a surface for travel of the equipment supported by the ground cover mat.

The core assembly is encased by the slab and disposed vertically between the lower major surface and the upper major surface of the ground cover mat. The core comprises a plurality of boards and a rebar mesh.

The boards extend horizontally and are disposed in horizontally spaced apart side-by-side relation with each other. In embodiments, the boards have a rectangular shape in a vertical cross-section. In one embodiment, the width of the board is greater than the height of the board in the vertical cross-section.

The rebar mesh is disposed on top of and is in contact with the plurality of boards. The rebar mesh comprises a first plurality of horizontally extending rebars disposed in horizontally spaced apart side-by-side relation with each other, and a second plurality of horizontally extending rebars disposed in horizontally spaced apart side-by-side relation with each other. The rebars of the second plurality of rebars are oriented transversely to and in contact with the rebars of the first plurality of rebars.

In embodiments of the ground cover mat, the mat has a substantially rectangular shape in a horizontal cross-section with a first pair of opposed edges extending horizontally in a first horizontal direction and a second pair of opposed edges extending horizontally in a second horizontal direction perpendicular to the first horizontal direction. The boards may be substantially aligned lengthwise parallel with the first horizontal direction. The rebars of the first plurality of rebars may also be substantially aligned lengthwise parallel with the first horizontal direction. In one embodiment, the rebars of the second plurality of rebars are substantially aligned lengthwise parallel with the second horizontal direction. In other embodiments of the ground cover mat, the rebars of both the first plurality of rebars and the rebars of the second plurality of rebars may both be oriented lengthwise transversely to the first horizontal direction at a first angle and a different second angle, respectively.

In embodiments of the ground cover mat, the rebars of the first plurality of rebars extend lengthwise continuously over the plurality of boards. In other embodiments, the rebars of the first plurality of rebars may comprise a plurality of rebars that are lap spliced together to extend lengthwise over the plurality of boards.

In embodiments of the ground cover mat, the rebars of the second plurality of rebars extend lengthwise continuously across the plurality of boards. In other embodiments, the rebars of the second plurality of rebars may comprise a plurality of rebars that are lap spliced together to extend lengthwise across the plurality of boards.

In embodiments of the ground cover mat, the rebar mesh is secured with at least one fastener to the plurality of boards. In one embodiment, the at least one fastener may comprise a nail.

In embodiments of the ground cover mat, the rebars of the first plurality of rebars are welded to the rebars of the second plurality of rebars. In one embodiment, the rebars of the first plurality of rebars are welded at each of their ends to a different one of the rebars of the second plurality of rebars.

In embodiments of the ground cover mat, the rubber in the slab forming material comprises crumb rubber that is monolithically bound together. In one embodiment, the crumb rubber may be sourced from recycled tires. In one embodiment, the slab forming material may further comprise tire-derived fiber material from recycled tires, which is monolithically bound together with the crumb rubber. The crumb rubber and, if present, the fiber material, may be bound together using any suitable binders known in the art, including without limitation, liquid polyurea or polyurethane polymer binders that are cured under pressure.

In embodiments of the ground cover mat, the rebars of the rebar mesh are made of steel. In embodiments of the ground cover mat, the boards of the plurality of boards are made of wood.

In another aspect, the present invention comprises a method for producing a ground cover mat. The method comprises the steps of:
  (a) placing a core assembly inside a mold, the core assembly comprising:
    (i) a plurality of horizontally extending boards disposed in horizontally spaced apart side-by-side relation with each other; and
    (ii) a rebar mesh on top of and in contact with the plurality of boards, the rebar mesh comprising a first plurality of horizontally extending rebars disposed in horizontally spaced apart side-by-side relation with each other, and a second plurality of horizontally extending rebars disposed in horizontally spaced apart side-by-side relation with each other, wherein the rebars of the second plurality of rebars are oriented transversely to and in contact with the rebars of the first plurality of rebars;
  (b) placing a slab forming material comprising crumb rubber and a curable binder inside the mold so as to encase the core assembly; and
  (c) allowing the curable binder to cure while subjecting the slab forming material to pressure inside the mold to form a monolithic slab that encases the core assembly and defines a lower major surface and an upper major surface of the ground cover mat.

BRIEF DESCRIPTION OF DRAWINGS

Embodiments of the invention are described with reference to the accompanying drawings. In the drawings, like elements are assigned like reference numerals. The drawings are not necessarily to scale, with the emphasis instead placed upon the principles of the present invention. Additionally, each of the embodiments depicted is but one of a number of possible arrangements utilizing the fundamental concepts of the present invention. The drawings are briefly described as follows.

DETAILED DESCRIPTION

The present invention relates to a ground cover mat and a method for producing a ground cover mat. Any term or expression not expressly defined herein shall have its commonly accepted definition understood by a person skilled in the art.

References in this document to orientations, ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

As used herein, "rebar" shall refer to an elongate member having any cross-sectional shape, and made of any material, including without limitation, steel or a composite material, such as fiberglass. In embodiments, rebar may refer to members having circular cross-sections with diameters of at least about 5 mm, 6 mm, 7 mm, 8 mm, 9 mm, 10 mm, 11 mm, 12, mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm.

As used herein, "horizontally extending", "extend horizontally" and similar expressions in describing a surface, a rebar, or a board, shall mean that two points on the surface, or opposite ends of the rebar or the board are disposed horizontally apart from each other, and may be either at the same vertical elevation or different vertical elevations.

As used herein, "transverse" in describing the orientation of one rebar in relation to another, or in describing the orientation of a rebar in relation to a board, means that the two rebars, or that the rebar and the board, are oriented lengthwise in non-parallel relation to each other, and includes without limitation, the case where the two rebars are oriented perpendicularly to each other.

As used herein, "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

Referring to FIGS. 1 to 4, an exemplary non-limiting embodiment of the ground cover mat (10) of the present invention is depicted. The ground cover mat (10) generally comprises a slab (20) and a core assembly (30).

The slab (20) is made of a slab material comprising rubber. In the embodiment shown in the Figures, the slab (20) has a substantially rectangular shape in a horizontal cross-section and in a vertical cross-section, measuring approximately 14'-0" (4.3 meters) in length (i.e., in FIG. 1, the dimension in the up-down direction of the drawing plane), 7'-6" (2.3 meters) in width (i.e., in FIG. 1, the dimension in the left-right direction of the drawing plane), and 3 to 6" (0.07 to 0.15 meters) in depth (i.e., in FIG. 2, the dimension in the up-down direction of the drawing plane). In other embodiments (not shown), the slab (20) may have different shapes and sizes.

A purpose of the slab (20) is to define a horizontally extending lower major surface (22) and a substantially parallel horizontally extending upper major surface (24) of the ground cover mat (10). In the embodiment shown in the Figures, the lower major surface (22) and the upper major surface (24) are substantially smooth, and level.

A purpose of the core assembly (30) is to reinforce the slab (20). The core assembly (30) is encased by the slab (20) and disposed vertically between the lower major surface (22) and the upper major surface (24) of the ground cover mat (10). The core assembly (30) comprises a plurality of boards (40) and a rebar mesh (50).

The boards (40) extend horizontally and are disposed in horizontally spaced apart side-by-side relation with each other. In one embodiment, the boards (40) are made of wood. In other embodiments, the boards (40) may be made of any suitable material known in the art that has sufficient strength and rigidity for use in the ground cover mat (10) for a desired application.

In the embodiment shown in the Figures, there are six boards (40). Each board (40) has a substantially rectangular prismatic shape, measuring approximately 7'-0" (2.1 meters) in length (i.e., in FIG. 3, the dimension in the up-and-down direction of the drawing plane), 8" (0.20 meters) in width (i.e., in FIG. 3, the dimension in the left-right direction of the drawing plane), and 2" (0.05 meters) in height (i.e., in FIG. 4, the dimension in the up-down direction of the drawing plane). The boards (40) are aligned lengthwise to define a horizontal direction that is substantially parallel to the length of the slab (20), and are horizontally spaced apart at approximately 15" (0.38 meters) on center. As such, the boards (40) extend along substantially the entire length of the slab (20), and are distributed evenly across the width of the slab (20), with approximately 3.5" (0.09 meter) horizontal spaces between adjacent boards (40). In other embodiments (not shown), the boards (40) may have different cross-sectional shapes, sizes, lengths, distributions (including irregular spacing) across the slab (20), and angular orientations relative to the slab (20).

The rebar mesh (50) comprises a first plurality of horizontally extending rebars (52), disposed in horizontally spaced apart side-by-side relation to each other, and a second plurality of horizontally extending rebars (54) disposed in horizontally spaced apart side-by-side relation to each other.

In the embodiment shown in the Figures, the rebars of the first plurality of rebars (52) have a length approximately equal to the length of the slab (20), are aligned lengthwise substantially parallel to the length of the slab (20), and equally spaced apart at approximately 4" (0.10 meters) on center. The length of the rebars of the first plurality of rebars (52) allows them to extend lengthwise continuously over the plurality of boards (40) without the need for any lap splices. In other embodiments (not shown), each of the rebars of the first plurality of rebars (52) may comprise more than one rebar connected end to end, such as with a lap splice. In other embodiments (not shown), the rebars of the first plurality of rebars (52) may have different lengths, distributions (including irregular spacing) across the slab (20), and angular orientations relative to the slab (20).

In the embodiment shown in the Figures, the rebars of the second plurality of rebars (54) have a length approximately equal to the width of the slab (20), are aligned lengthwise substantially parallel to the width of the slab (20), and equally spaced apart at approximately 4" (0.10 meters) on center. The length of the rebars of the second plurality of rebars (54) allows them to extend lengthwise continuously across the plurality of boards (40) without the need for any lap splices. In other embodiments (not shown), each of the rebars of the second plurality of rebars (54) may comprise more than one rebar connected end to end, such as with a lap splice. In other embodiments (not shown), the rebars of the second plurality of rebars (54) may have different lengths, distributions (including irregular spacing) across the slab (20), and angular orientations relative to the slab (20).

The rebar mesh (50) is disposed on top of the plurality of boards (40) and is in contact with plurality of boards (40). In the embodiment shown in FIG. 4, the rebars of the first plurality of rebars (52) are in contact with the boards (40), and disposed vertically between the boards (40) and the second plurality of rebars (54). In other embodiments (not shown) the second plurality of rebars (54) may be in contact with the boards (40), and disposed between the boards (40) and the first plurality of the rebars (52).

In the embodiment shown in the Figures, the rebars of the rebar mesh (50) have a circular shaped vertical cross-section with a diameter of approximately 11 mm, and are made of high strength structural steel. As a non-limiting example, the steel may have a yield strength of approximately 400 MPa. In other embodiments, the rebars of the rebar mesh (50) may have other shapes or sizes (e.g., cross-sectional diameters of approximately 6 mm, 9.5 mm, 12.7 mm, 16 mm, 19 mm, 22 mm, 25 mm, 30 mm and larger may be used) and be made of any suitable material known in the art that has sufficient strength and rigidity for use in the ground cover mat (10) for a desired application.

In one embodiment, the rebar mesh (50) is secured to plurality of boards (40) with fasteners, such as nails. Each nail is driven partially into one of the boards (40) at a location adjacent to where one of the rebars of the rebar mesh (50) intersects the board (40). The other end of the nail extending from the board (40) is then bent, such as by hammering or bending with pliers, to form a hook-shaped member around the one of the rebars of the rebar mesh (50).

In one embodiment, the rebars of the first plurality of rebars (52) are welded to the rebars of the second plurality of rebars (54). For example, the rebars of the first plurality of rebars (52) are welded at each of their ends to a different on the rebars of the second plurality of rebars (54).

In embodiments of the ground cover mat (10), the rubber in the slab forming material comprises crumb rubber that is monolithically bound together. In one embodiment, the crumb rubber may be sourced from recycled tires (e.g., natural or synthetic rubber such as styrene-butadiene rubber) and ground up into particles. In one embodiment, the slab forming material may further comprise tire-derived fiber material (e.g., steel, aramid, nylon, polyester materials generated during crumb rubber production from recycled tires) that is monolithically bound together with the crumb rubber. The crumb rubber and the fiber material, if present, may be bound together using any suitable binders known in the art, including without limitation, cured polyurea or polyurethane polymer binders.

In an exemplary use, the lower major surface (22) of the ground cover mat is placed in contact with a ground surface, while the upper major surface (24) provides a surface for travel of equipment supported by the ground cover mat (10). As an example, the ground cover mat (10) may be used as a drilling pad to support a mobile drilling rig, and associated vehicles and equipment at an oil well site. When a load, such as the mobile drilling rig, is placed on the upper major surface (24) of the ground cover mat (10), the upper portions of the slab (20) transmit the load downwardly to the rebar mesh (50). The rebar mesh (50) has a tendency to deform downwards in the vicinity of the load and bear downwardly against the underlying plurality of boards (40). Thus, in embodiments, it is believed that the rebar mesh (50) may distribute the load over a larger area of the boards (40) than if the rebar mesh (50) were absent, and the boards (40) may help avoid local stresses at the interfaces between the rebar mesh (50) and the slab (20) if the board (40) were absent. Thus, in embodiments, the plurality of boards (40) and the rebar mesh (50) may act together to rigidify the ground cover mat (10). Further, the rebar mesh (50) may reduce the risk of localized failure of the boards (40) in the immediate vicinity of the load, and the boards (40) may reduce the risk of localized failure of the slab (20) in the immediate vicinity of the load.

Figure 1:
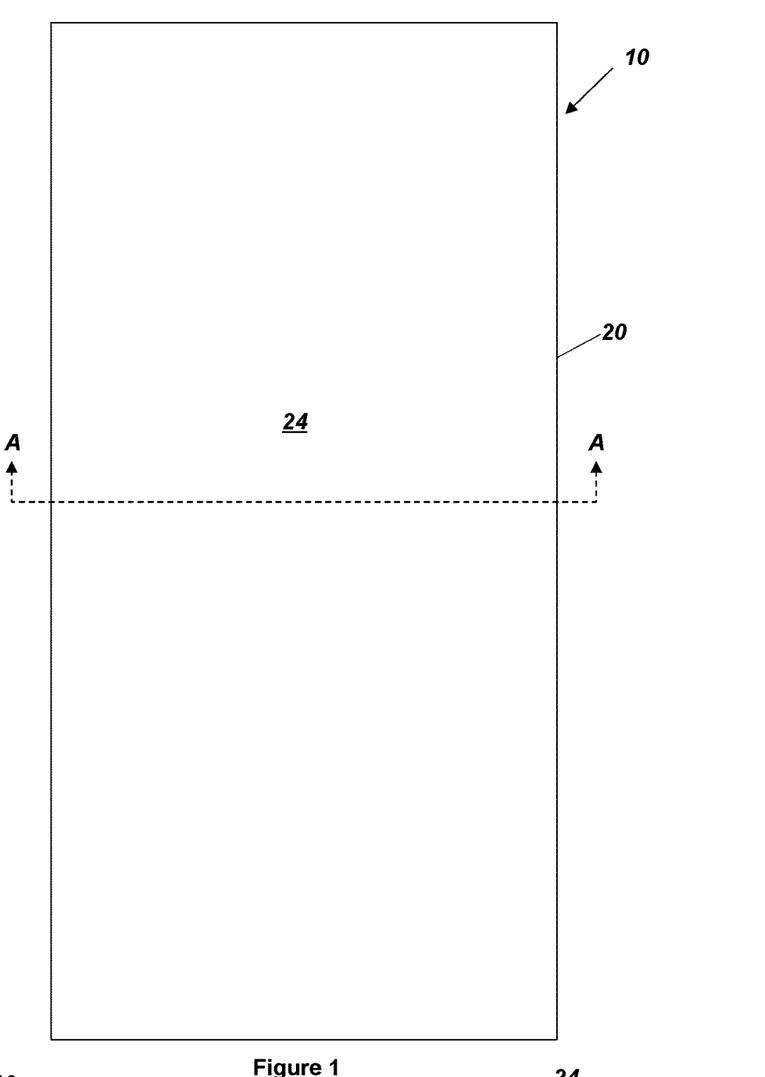
FIG. 1 is a top plan view of an embodiment of a ground cover mat of the present invention.
Figure 2:
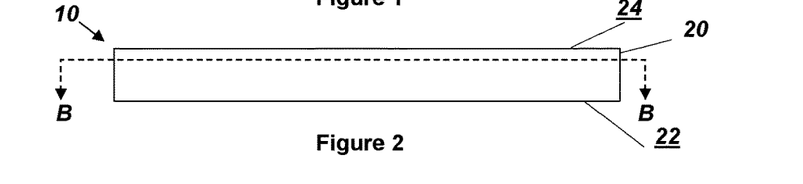
FIG. 2 is an end elevation view of the ground cover mat shown in FIG. 1.
Figure 3:
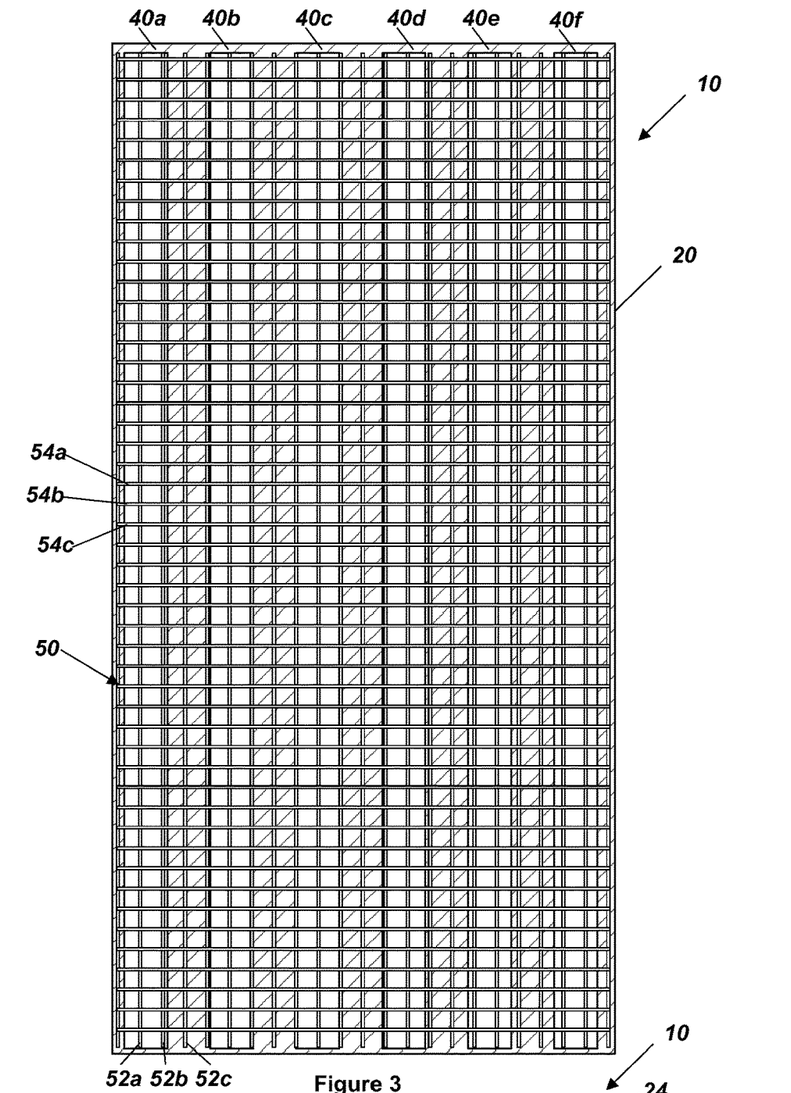
FIG. 3 is a cross-sectional top plan view of the ground cover mat of FIG. 1, as viewed along section B-B of FIG. 2.
Figure 4:
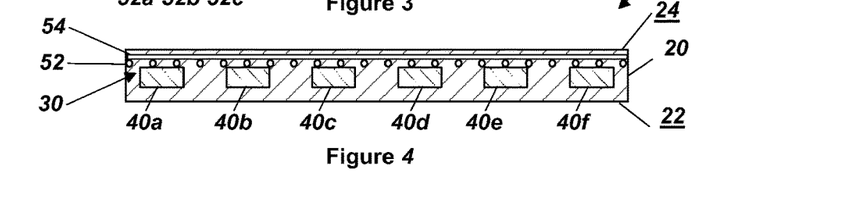
FIG. 4 is a cross-sectional end elevation view of the ground cover mat of FIG. 1, as viewed along section A-A of FIG. 1.
Figure 5:
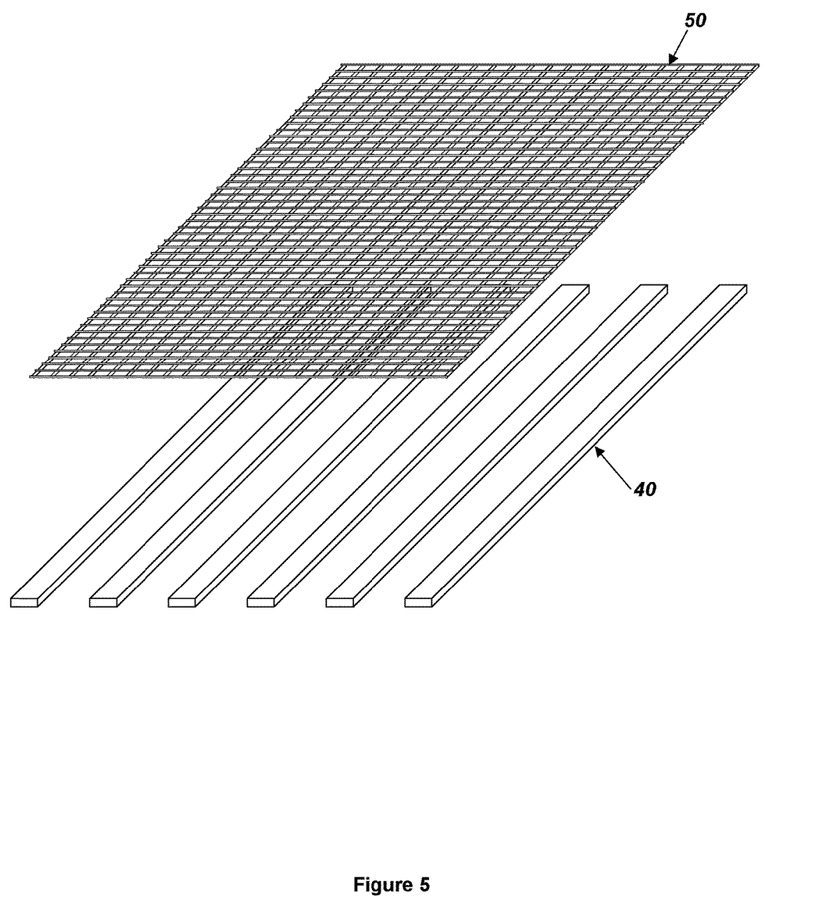
FIG. 5 is a perspective view of the boards and rebar mesh of the core assembly of the ground cover mat shown in FIG. 1, when the core assembly is under construction.
Figure 6:
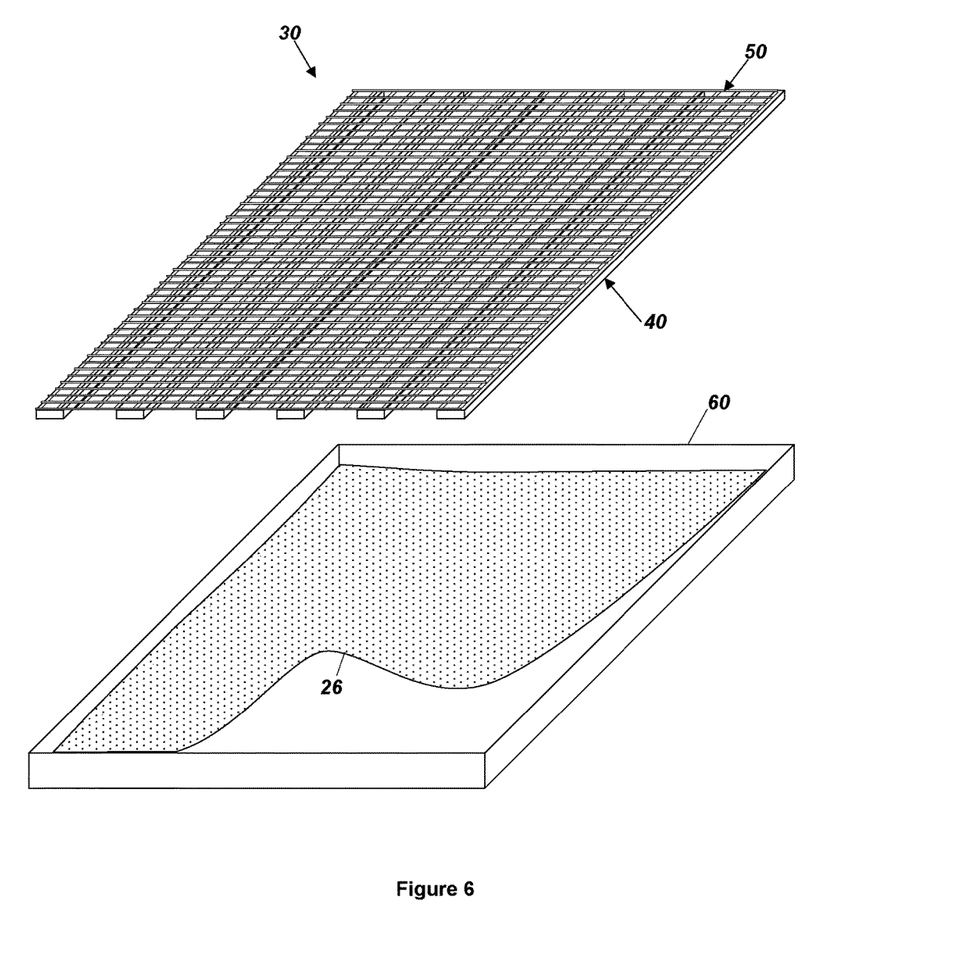
FIG. 6 is a perspective view of the core assembly outside of a mold partially filled with a slab forming material, when the ground cover mat shown in FIG. 1 is under construction.
Figure 7:
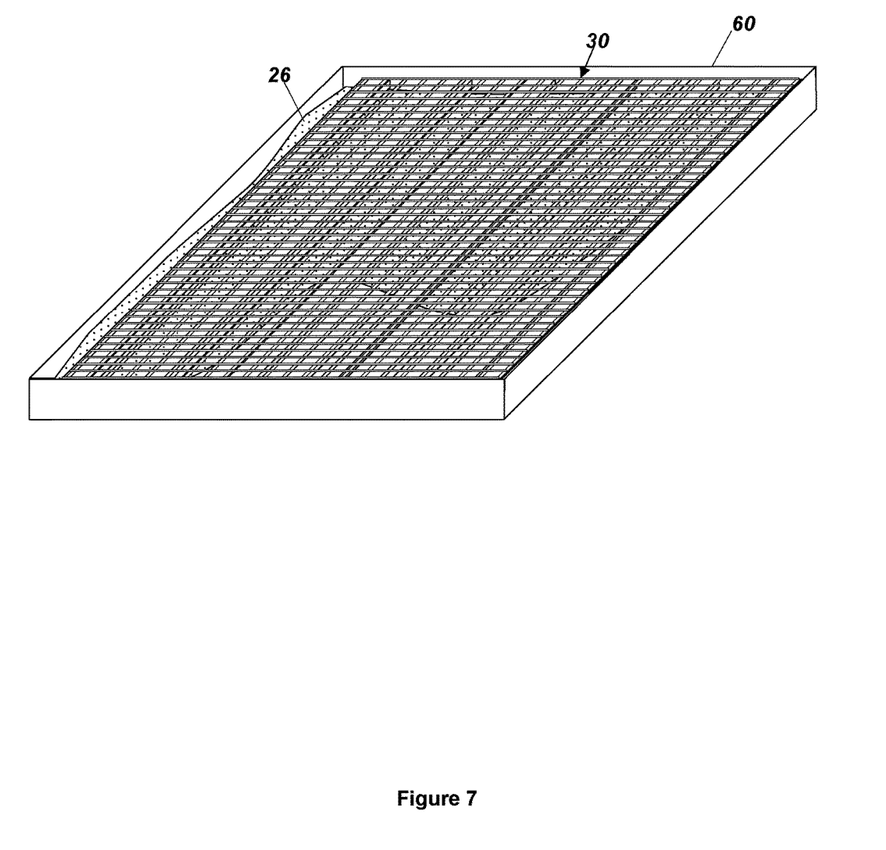
FIG. 7 is a perspective view of the core assembly placed within a mold partially filled with a slab forming material, when the ground cover mat shown in FIG. 1 is under construction.

In another aspect, the present invention comprises a method for producing a ground cover mat (10). Referring to FIG. 5, in one embodiment, the rebar mesh (50) is pre-formed separately by arranging the first plurality of rebars (52) and the second plurality of rebars (54), and welding them together, as described above. Referring to FIG. 6, the core assembly (30) is the pre-formed by nailing the rebar mesh (50) to the plurality of boards (40) with nails, as described above. An initial portion of a slab forming material (26) comprising crumb rubber from recycled tires, and a curable binder such as a polyurea or polyurethane polymer binder is then placed in a mold (60). In embodiments, the slab forming material (26) may further comprise tire-derived fiber from recycled tires. In the exemplary embodiment, the mold (60) shapes the slab forming material (26) to form the lower major surface (22), and vertical faces of the slab (20). Referring to FIG. 7, the core assembly (30) is placed as a unit into the mold (60), and an additional portion of the slab forming material (26) is placed into the mold (60) on top of the core assembly (30). The particle sizes of the crumb rubber and fiber should be sufficiently small so that the particles can fall between the openings of the rebar mesh (50) and fill the spaces between the boards (40) and the rebar mesh (50). When the slab forming material (26) fills the mold (60), the top surface of the slab forming material (26) may be screeded to form the upper major surface (24) of the ground cover mat (10). The curable binder is then allowed to cure while subjecting the slab forming material (26) to pressure inside the mold (60) to form the slab (20), as a monolithic unit that encases the core assembly (30), with the core assembly (30) disposed vertically between the lower major surface (22) and the upper major surface (24).

The present invention has been described above and shown in the drawings by way of exemplary embodiments and uses, having regard to the accompanying drawings. The exemplary embodiments and uses are intended to be illustrative of the present invention. It is not necessary for a particular feature of a particular embodiment to be used exclusively with that particular exemplary embodiment. Instead, any of the features described above and/or depicted in the drawings can be combined with any of the exemplary embodiments, in addition to or in substitution for any of the other features of those exemplary embodiments. One exemplary embodiment's features are not mutually exclusive to another exemplary embodiment's features. Instead, the scope of this disclosure encompasses any combination of any of the features. Further, it is not necessary for all features of an exemplary embodiment to be used. Instead, any of the features described above can be used, without any other particular feature or features also being used. Accordingly, various changes and modifications can be made to the exemplary embodiments and uses without departing from the scope of the invention as defined in the claims that follow.

The embodiments of the invention in which an exclusive property or privilege is claimed are defined as follows:

1. A ground cover mat comprising:
   (a) a slab made of a slab material comprising rubber, the slab defining a horizontally extending lower major surface of the ground cover mat and a horizontally extending upper major surface of the ground cover mat; and
   (b) a core assembly encased by the slab and disposed vertically between the lower major surface and the upper major surface of the ground cover mat, the core comprising:
   (i) a plurality of boards extending horizontally along a majority of the length of the slab and disposed in horizontally spaced apart side-by-side relation with each other; and
   (ii) a rebar mesh disposed on top of and in contact with the plurality of boards, the rebar mesh comprising a first plurality of horizontally extending rebars disposed in horizontally spaced apart side-by-side relation with each other, and a second plurality of horizontally extending rebars disposed in horizontally spaced apart side-by-side relation with each other, wherein the rebars of the second plurality of rebars are oriented transversely to and in contact with the rebars of the first plurality of rebars;
   wherein the first plurality of rebars are in contact with the boards and disposed vertically between the boards and the second plurality of rebars, or the rebars of the second plurality of rebars are in contact with the boards and disposed vertically between the boards and the first plurality of rebars: and
   wherein the rubber of the slab material fills spaces between the rebars of the rebar mesh and the boards.

2. The ground cover mat of claim 1 wherein the mat has a substantially rectangular shape in a horizontal cross-section with a first pair of opposed edges extending horizontally in a first direction and a second pair of opposed edges extending horizontally in a second horizontal direction perpendicular to the first horizontal direction, wherein boards of the plurality of boards are substantially aligned lengthwise parallel with the first horizontal direction.

3. The ground cover mat of claim 2 wherein the rebars of the first plurality of rebars are substantially aligned lengthwise parallel with the first horizontal direction.

4. The ground cover mat of claim 3 wherein the rebars of the second plurality of rebars are substantially aligned lengthwise parallel with the second horizontal direction.

5. The ground cover mat of claim 1 wherein the rebars of the first plurality of rebars extend lengthwise continuously over the plurality of boards.

6. The ground cover mat of claim 1 wherein the rebars of the second plurality of rebars extend lengthwise continuously across the plurality of boards.

7. The ground cover mat of claim 1 wherein the rebar mesh is secured with at least one fastener to the plurality of boards.

8. The ground cover mat of claim 7 wherein the at least one fastener comprises a nail.

9. The ground cover mat of claim 1 wherein the rebars of the first plurality of rebars are secured to the rebars of the second plurality of rebars.

10. The ground cover mat of claim 8 wherein the rebars of the first plurality of rebars are welded to the rebars of the second plurality of rebars.

11. The ground cover mat of claim 1 wherein the rubber comprises crumb rubber monolithically bound together.

12. The ground cover mat of claim 1 wherein the rebars of the rebar mesh are made of steel.

13. The ground cover mat of claim 1 wherein the boards of the plurality of boards are made of wood.

14. The ground cover mat of claim 1 wherein the rebars of the rebar mesh have a diameter of at least 5 mm.

15. The ground cover mat of claim 14 wherein the diameter is at least 10 mm.

16. A method for producing a ground cover mat, the method comprising the steps of:
  (a) placing a core assembly inside a mold, the core assembly comprising:
    (i) a plurality of boards extending horizontally along a majority of the length of the slab and disposed in horizontally spaced apart side-by-side relation with each other; and
    (ii) a rebar mesh disposed on top of and in contact with the plurality of boards, the rebar mesh comprising a first plurality of horizontally extending rebars disposed in horizontally spaced apart side-by-side relation with each other, and a second plurality of horizontally extending rebars disposed in horizontally spaced apart side-by-side relation with each other, wherein the rebars of the second plurality of rebars are oriented transversely to and in contact with the rebars of the first plurality of rebars;
    wherein the first plurality of rebars are in contact with the boards and disposed vertically between the boards and the second plurality of rebars, or the rebars of the second plurality of rebars are in contact with the board and disposed vertically between the boards and the first plurality of rebars;
  (b) placing a slab forming material comprising crumb rubber and a curable binder inside the mold so as to encase the core assembly, wherein the crumb rubber fills spaces between the rebars of the rebar mesh and the boards; and
  (c) allowing the curable binder to cure while subjecting the slab forming material to pressure inside the mold to form a monolithic slab defining a lower major surface and an upper major surface of the ground cover mat.

17. The method of claim 16 further comprising the step of securing the rebar mesh with at least one fastener to the plurality of boards.

18. The method of claim 17 wherein the at least one fastener comprises a nail.

19. The method of claim 16 wherein the rebars of the rebar mesh have a diameter of at least 5 mm.

20. The method of claim 19 wherein the diameter is at least 10 mm.

* * * * *